Oct. 24, 1933.  A. E. VAN EMDEN  1,932,298

MOLD FOR CHOCOLATE ARTICLES

Filed Oct. 24, 1932

Inventor:-
August Emile van Emden.
By — Horace B. Hall
Attorney.

Patented Oct. 24, 1933

1,932,298

UNITED STATES PATENT OFFICE 1,932,298

MOLD FOR CHOCOLATE ARTICLES

August Emile van Emden, New York, N. Y., assignor to Volquardt O. Hermann, New York, N. Y.

Application October 24, 1932. Serial No. 639,324

3 Claims. (Cl. 107—19)

My invention is an improvement in molds for forming chocolate articles and relates more particularly to that special type comprising opposing sections hingedly connected at one side permitting them to be opened in filling the mold chambers and removing the molded article, and in which the mold sections are held in closed relation during the hardening of the confection by interengaging means located opposite the hinge. In molds of this type it is customary to stamp the top of the mold, or top of the upper section thereof, to produce an embossed ornament on the chocolate article, and when the embossed portion of the confection is to be of material different in color from that of the body of the article this material is usually applied by daubing it on the inner side of the stamped out portion of the mold before filling the two sections thereof. In carrying out this process it is usual to provide different molds in the production of chocolate articles having different ornamentations; that is to say, though the molds may be made to produce articles of the same general shape, as for instance an egg as illustrated in the drawing, the stamped out portions are different to change the embossing or ornamentation.

The principal object of my invention therefore is to provide a mold of this general type with an interchangeable portion which will not only simplify the operation of filling the mold sections with the different materials for the body of the article and ornamentation but also provide a mold structure which at comparatively small expense is adapted to form a variety of ornaments on the body of similar articles formed by the main mold sections.

With this principal object in view my invention contemplates a construction of two-part mold device in which that part of the mold or top of the upper section thereof constitutes a separate piece detachably connected to the mold section, and this detachable piece is stamped or depressed from the inner side thereof to form the design which is to be embossed on the article produced by the mold, whereby ornamental pieces or die members may be substituted for the purpose of changing the embossed design ornamenting the top of the article. Consequently the present invention consists of a mold having the top portion thereof which forms the embossed portion of the molded article detachably connected to the body of the mold, the said top portion being preferably hingedly connected so that it may swing back to receive the material or confection with a catch member opposite the hinge cooperating with a companion catch member on the body of the mold for holding the embossing device in closed relation thereto, as hereinafter fully described and more specifically set forth in the appended claims.

In the accompanying drawing forming a part hereof:

Figure 1:
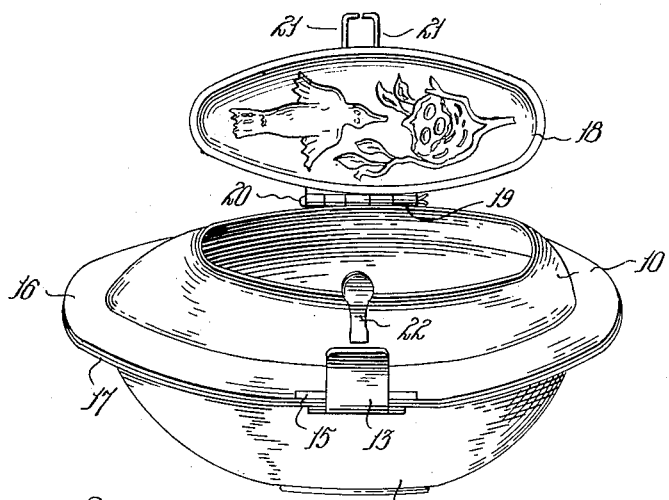
Figure 1 is a perspective view of a mold constructed in accordance with my invention, the embossing device being in open position.
Figure 2:
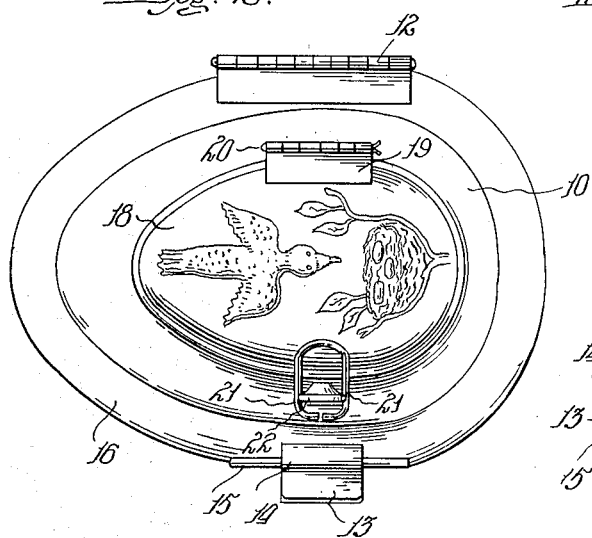
Fig. 2 is a plan view of the mold.
Figure 3:
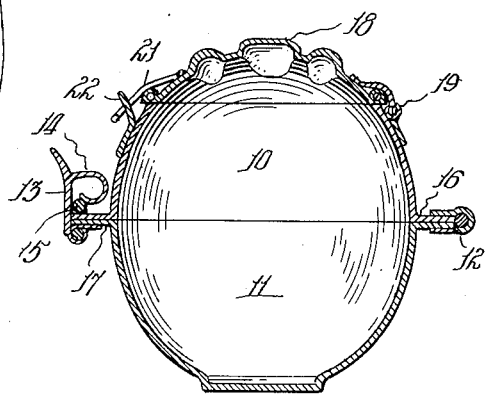
Fig. 3 is a transverse sectional view through the center of the mold.
Figure 4:
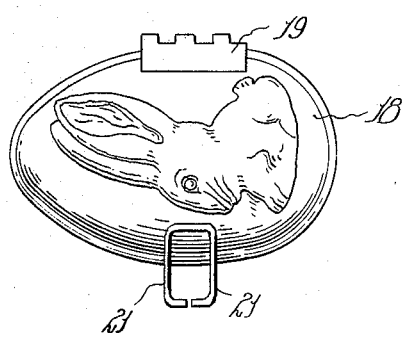
Fig. 4 is a detail plan view of the embossing device.

My improvement in molds for forming chocolate articles, etc., is illustrated for example in connection with that type comprising upper and lower mold sections 10, 11, connected together at one side by a hinge 12 so that they may swing open in filling the chambers of said sections as well as in removing the molded article, and are held in closed relation by an ordinary form of catch consisting of a pivoted hook 13 carried by one of the mold sections, as 11, and having a curved bill 14 adapted to be sprung over a short rod 15 on the other mold section, 10. In this type of mold for forming an article having the central portion of greater diameter than the upper and lower portions thereof it is also customary to provide the meeting edges of the mold sections with outwardly projecting flanges 16, 17, which abut each other in closed relation of said mold sections. It will be understood, however, that my improvement is applicable to other forms of molds, and that when applied to a two-part mold such as illustrated in the drawing the shape of the cooperating sections 10 and 11, providing the chambers shaping the molded article, may be modified according to fancy or character of the article to be produced.

In carrying out my invention the top of the rounded upper mold section 10 which is usually stamped to form the embossed ornamentation on the molded article is cut away and in its place I employ a die member 18 connected to said section, as by hinge 19, so that it may be swung to open and closed position, and for readily substituting a member or die having a different ornamental design a detachable connecting means is employed, as for instance a butt hinge shown in the drawing with the pintle 20 in the form of a cotter pin. This arrangement provides a comparatively small die member on the mold in which the material or confection to form the embossed ornamentation can be easily placed before or after the body of the mold or chambers of the mold sections 10 and 11 have been filled, it being obvious that the opening covered by said die member permits the body of the mold to be filled while the sections thereof are secured together by the catch 13, the sections of the mold being opened when the molded article is to be removed. For holding the die member closed on the upper mold section any form of catch may be employed, that shown being of an ordinary form with spring members 21, 21, which in closed position of the die members spring over a companion catch member 22 on the mold section, the outer end or head of this member 22 being circular in shape to pass between the spring members 21 for engagement of the latter below the head.

From the foregoing description it will be obvious that my invention provides a mold device for forming articles of chocolate confection or other material by which the design in the top of a single mold to form the ornamental feature of the molded article can be readily changed, and in this manner the character of the mold with respect to the ornamentation of the molded article varied by the substitution of a different die member; that is to say, it is contemplated that with each mold device any number of die members may be furnished at very little additional expense.

As hereinbefore stated my improvement is especially applicable to that type of mold adapted to form chocolate articles having a central portion of greater diameter than the upper and lower portions of said article, requiring that the mold be made up in two sections abutting each other when closed so that the molded article may be freely discharged from the molding chambers of said sections when opened. In this type of mold as heretofore constructed it is necessary to open the mold sections in filling the molding chambers, and although the important feature of providing the detachable die member is for the purpose of substituting other die members on this kind of two-part mold structure the employment of said die member has the additional advantage of permitting the body of the mold to be filled through the opening covered by the die member while the mold sections are clamped together instead of requiring said mold sections to be opened for this operation; that is to say, the main mold sections may be closed while filling the same and opened for discharging the molded article. It will be understood of course that after the main mold sections are filled with chocolate the material which is to form the embossed ornamentation is placed in the opened die member and the latter closed to apply said material on the chocolate contained within the main mold sections.

I claim:

1. A mold for forming chocolate eggs or articles of the kind having an ornamental portion at one side thereof, said mold comprising connected mold sections adapted to be opened for discharging the molded article, one of said mold sections being cut away in the central part of the body portion thereof to provide an opening in the mold where the ornamentation on the side of the molded article is to be formed, and a die member hinged at one side of the aforesaid opening for covering the same and for forming the ornamentation.

2. A mold for forming chocolate eggs or articles of the kind having an ornamental portion at one side thereof, said mold comprising hingedly connected mold sections adapted to be opened for discharging the molded article and means for holding said mold sections together, one of said mold sections being cut away in the central part of the body portion thereof to provide an opening in the mold where the ornamentation on the side of the molded article is to be formed, a die member for covering said opening and for forming the ornamentation, means for detachably connecting the die member to the mold at one side of the opening therein, whereby dies having different ornamental designs may be used in connection with the mold, and means for holding the die member in closed position on the mold.

3. A mold for forming chocolate articles of the kind having an ornamental top portion, said mold comprising hingedly connected upper and lower mold sections adapted to be opened for discharging the molded article and means for holding the mold sections together, the upper mold section being cut away at the top to provide an opening where the ornamentation on the molded article is to be formed, a die member for covering said opening and for forming the ornamentation, a butt hinge connecting the die member to the upper section at one side of the opening, and a cotter pin forming the pintle of the butt hinge whereby die members having different ornamental designs may be used in connection with the mold; together with means for holding the die member closed on the mold.

AUGUST EMILE van EMDEN.